(12) United States Patent
Chauvin

(10) Patent No.: US 8,446,032 B2
(45) Date of Patent: May 21, 2013

(54) HYDROELECTRIC POWER GENERATOR AND RELATED METHODS

(75) Inventor: Phillip Lynn Chauvin, Lincoln, CA (US)

(73) Assignee: Chaup Inc., Lincoln, CA (US)

( * ) Notice: Subject to any disclaimer, the term of this patent is extended or adjusted under 35 U.S.C. 154(b) by 798 days.

(21) Appl. No.: 12/554,874

(22) Filed: Sep. 4, 2009

(65) Prior Publication Data

US 2011/0057442 A1    Mar. 10, 2011

(51) Int. Cl.
*F03B 13/00* (2006.01)
*H02P 9/04* (2006.01)

(52) U.S. Cl.
USPC .......................................................... 290/54

(58) Field of Classification Search
USPC ......................................... 290/52–54, 42, 43
See application file for complete search history.

(56) References Cited

U.S. PATENT DOCUMENTS

| | | | |
|---|---|---|---|
| 2,222,790 A * | 11/1940 | Scharrel | 290/54 |
| 3,986,787 A | 10/1976 | Mouton, Jr. et al. | |
| 4,104,536 A | 8/1978 | Gutsfeld | |
| 4,239,976 A | 12/1980 | Collard | |
| 4,301,377 A | 11/1981 | Rydz | |
| 4,598,210 A | 7/1986 | Biscomb | |
| 7,223,137 B1 | 5/2007 | Sosnowski | |
| 7,471,009 B2 * | 12/2008 | Davis et al. | 290/54 |
| 2006/0108809 A1 * | 5/2006 | Scalzi | 290/55 |
| 2008/0191486 A1 | 8/2008 | Sugano | |
| 2008/0203729 A1 | 8/2008 | Zajchowski et al. | |

FOREIGN PATENT DOCUMENTS

WO    WO-2009/062262 A1    5/2009

* cited by examiner

*Primary Examiner* — Javaid Nasri
(74) *Attorney, Agent, or Firm* — Ashok K. Janah; Janah & Associates, P.C.

(57) ABSTRACT

A hydroelectric power generator is capable of generating electrical power from a moving body of water. The power generator comprises a shell comprising a wall having interior and exterior surfaces, and an interior volume. A fixed gear is fixedly attached to the interior surface of the shell. A stationary shaft extends across the interior volume of the shell. A set of fins is attached to the exterior surface of the shell, and the fins are capable of rotating the shell about the stationary shaft from the force of the moving body of water. An electrical generator is mounted on the stationary shaft. The generator comprises a drive gear that engages the fixed gear to drive the electrical generator. An electrical connector transmits the generated electrical power to the external environment.

22 Claims, 9 Drawing Sheets

HYDROELECTRIC POWER GENERATOR AND RELATED METHODS

BACKGROUND

Embodiments of the present apparatus relate to a hydroelectric power generator and related methods.

The increasing demand for energy through the world requires development of renewable sources of energy. Conventional energy fossil fuel energy sources, such as oil, coal and gas, have carbon emissions that are no longer tolerable for the planet. Reliable sources of renewable energy can reduce the growing danger of global warming caused by the combustion of fossil fuels. Further, the increasing energy demand of consumers in developing nations has led to higher prices, price instabilities, and shortages of natural gas and oil. Still further, the use of atomic energy for electrical generation faces the inherent dangers of atomic reactions and the reluctance of local communities to accept nuclear power plants. As a consequence of these myriad factors, there is increasing interest in generating electricity from non-polluting, renewable energy sources. Further, because electrical power generated by most renewable energy sources is typically not storable, it is desirable to use renewable energy sources that can generate power throughout the day when the demand is highest, and such sources are said to have a "high capacity factor."

One source of renewable energy having a potentially high capacity factor is wind energy. Wind generators and wind farms are being increasingly adopted throughout the world, especially in regions having consistently high wind speeds. However, wind powered generating systems provide inherently intermittent power generation because wind speeds often fluctuate throughout the day and in seasonal patterns. As such, wind powered generators often cannot be relied upon to produce electrical power at peak demand times or consistently throughout the year.

Hydroelectric power that is generated from turbines located at dams along rivers is also extensively used. The dam holds and stores water in a lake at an elevated height, and the potential energy of the water falling from the higher elevation to a lower elevation is used to drive electrical generation turbines. However, these are often multibillion dollar projects that are both expensive and can create further environmental problems. Further, the construction of a dam is often limited to particular locations which are not available in all areas. For example, dams require a location between hills to allow creation of a natural reservoir. Further, the weight and structure of the dam often requires particular soil conditions, which include bedrock relatively close to the surface of the land, and surface layers of alluvial soil or sand.

Yet another source of renewable hydroelectric energy can come from the ocean. Hydroelectric power can be generated using the energy of waves, tidal flows, or ocean currents. These energy sources have a more predictable output than wind energy. However, they are also subject to day-to-day and seasonal variations. Further, generation of such power is limited to coastal regions and would require transportation from the ocean to distant land usages which results in high transmission losses. Even more importantly, conventional apparatus for converting ocean currents and tides to electrical energy is relatively inefficient, which further limits their use.

Hydroelectric power can also be generated from small rivers and fast-moving streams which are often located further inland. These locations are often further inland and thus allow the generation of electricity closer to the actual usage point, minimizing transmission costs and power losses incurred across large distances. Further, some states and countries require power companies to purchase surplus electricity from private generation facilities, providing an incentive for land owners with transient water canals or streams to exploit this natural source of renewable energy. For these and other reasons, many conventional river power generators have been designed, including water wheels to capture energy from the moving water stream, paddle generators, and others—for example, as described in U.S. Pat. No. 6,616,403, Ser. Nos. 10/489,642, 11/805,790, 11/805,790, 11/823,292, U.S. Pat. Nos. 7,215,036, and 7,223,137. However, the size and complexity of many of these systems preclude their use in local rivers and small streams. Further, many such systems produce low levels of electricity rendering capitalization costs for small land owners impractical.

For various reasons that include these and other deficiencies, and despite the development of various hydroelectric power generation systems for oceans, rivers and streams, further improvements in hydroelectric power generation technology are continuously being sought.

SUMMARY

A hydroelectric power generator is capable of generating electrical power from a moving body of water. The power generator comprises a shell comprising a wall having interior and exterior surfaces, and an interior volume. A fixed gear is fixedly attached to the interior surface of the shell. A stationary shaft extends across the interior volume of the shell. A set of fins is attached to the exterior surface of the shell, and the fins are capable of rotating the shell about the stationary shaft from the force of the moving body of water. An electrical generator is mounted on the stationary shaft. The generator comprises a drive gear that engages the fixed gear to drive the electrical generator. An electrical connector transmits the generated electrical power to the external environment.

In another aspect, a chained assembly of power generators for generating electrical power from a moving body of water comprises a plurality of power generators, each power generator comprising: (i) a shell comprising a wall that encloses an interior volume, the wall having an exterior surface; (ii) a fixed gear attached to the wall of the shell; (iii) a stationary shaft extending across the interior volume of the shell; (iv) a plurality of fins attached to the exterior surface of the shell, the fins capable of rotating the shell about the stationary shaft from a force applied by the moving body of water; (v) an electrical generator in the interior volume, the electrical generator comprising a drive gear that mechanically engages the fixed gear to drive the electrical generator to generate electrical power; and (vi) an electrical connector to transmit the generated electrical power to the external environment. A plurality of anchoring stands, each anchoring stand supporting at least one power generator in the body of water.

In still another embodiment, the chained assembly comprises a grid of mooring lines that suspends the power generators above the water.

DRAWINGS

These features, aspects and advantages of the present invention will become better understood with regard to the following description, appended claims, and accompanying drawings, which illustrate examples of the invention. However, it is to be understood that each of the features can be used in the invention in general, not merely in the context of the particular drawings, and the invention includes any combination of these features, where:

DESCRIPTION

A hydroelectric power generator is capable of generating electrical power from a moving body of water above and adjacent to land. The hydroelectric power generator produces electricity without the use of fossil fuels, with good efficiency, and can be used in a variety of different locations. The power generator can be operated in a moving body of water, such as a stream, canal, river, lake, bay, estuary, or even an ocean. For example, a moving body of water such as a canal, stream or river has a direction of flow of water in a stream that is generated by gravity. The power generator allows extracting energy from such flowing waters without the construction of expensive dams. The power generator presents a low cost alternative allowing consumers living on fast moving streams, canals and rivers, to purchase and install a local power generating system to meet their needs or even to sell excess power back to the power company. As another example, an ocean can have a direction of flow of water that is generated by ocean currents or the ocean tides. The power generator can also be used to tap the energy of ocean currents and tides at the surface of the ocean.

Generally, the power generator 20 comprises a hollow shell 22 defined by a wall 24 with an interior surface 26 enclosing an interior volume 28 and an exterior surface 30, as shown in FIGS. 1A to 1E. The interior volume 28 should be sufficiently large to enclose internal components, such as an electric generator, shafts, and other parts. The shell 22 is capable of being suspended over or inside a body of water, or to float at a predetermined depth or on the surface of a moving body of water 32. The moving body of water 32 has a flow direction 34, such as a tide or water current, having a predetermined or particular flow direction for a period of time. The shell 22 can be spherical, cylindrical, or a shape required by physical environment. For example, the shell 22 can be an oblong spheroid. The material used to fabricate the shell 22 should be resistant to the external environment and provide an airtight or watertight seal. The wall 24 of the shell 22 can be made of a polymer such as acrylic, or can be metal, ceramic, concrete, or a composite material, such as even fiberglass. The shell 22 can also be made from an environmentally friendly material such as ceramic or concrete, which if it sinks to the bottom does not harm the environment of the stream or ocean.

Figures 1A, 1B, 1C:
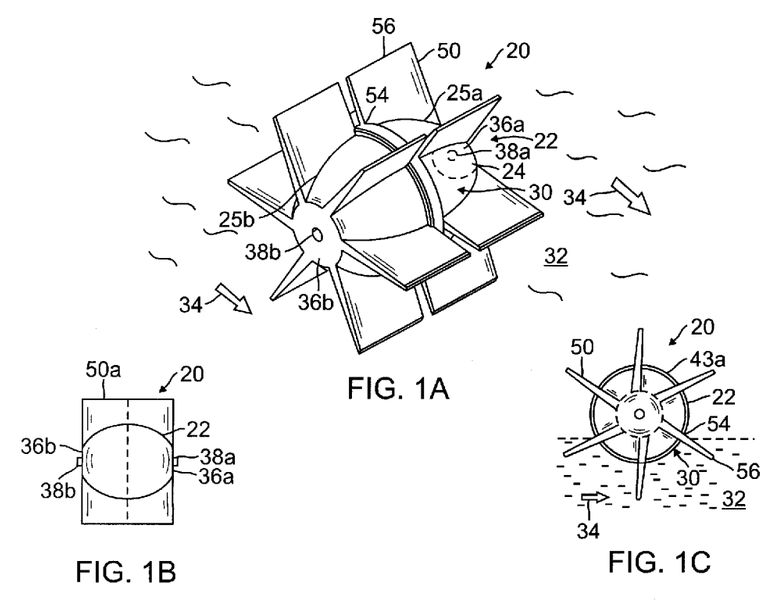
FIG. 1A is a perspective view of an embodiment of a hydroelectric power generator.
FIG. 1B is a front view of the power generator of FIG. 1A.
FIG. 1C is a side view of the power generator of FIG. 1A.

The shell 22 can be adapted to sink in water, or be designed to be a buoyant shell 22 that floats at a predetermined height in a body of water 32 or on the surface of the body of water 32 as shown in FIG. 1A. The buoyancy of a buoyant shell 22 is selected to obtain a predetermined flotation height inside the body of water 32, or on the surface of the water 32. The buoyant shell 22 also provides a watertight and sealed interior volume 28. The buoyant shell 22 can also have different sizes depending on the interior volume 28 needed to contain a generator or other hardware. The interior volume 28 and weight of the buoyant shell 22 and its internal components is adjusted to obtain the desired level of buoyancy that sustains the weight of the internal components while still allowing flotation at an acceptable depth or on the surface of a body of water 32.

Figure 5A:
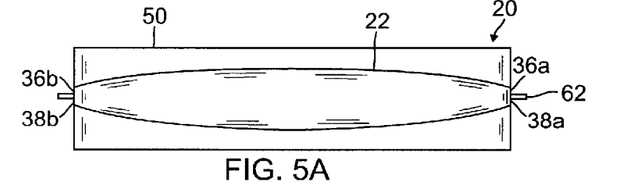
FIGS. 5A and 5B are front views of embodiments of the power generator having elongated and streamlined shells and fins.
Figure 5B:
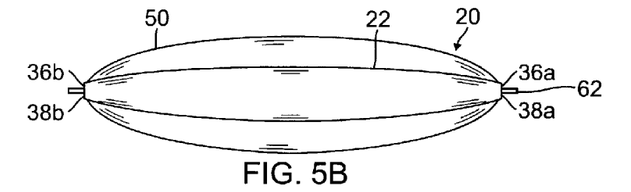

The buoyant shell 22 has an external shape designed to provide an exterior surface 30 that provides a smooth flow of water with low turbulence. The exterior surface 30 also has an external profile designed to provide a smooth flow of water with low turbulence in the body of water 32. For example, the shell 22 can be a sphere, cylinder, oblong spheroid, rectangular box, or polyhedron. For example, a suitable shape for the shell 22 is a spherical shape, such as a sphere or oval shape, an elongated or oblong spheroid as shown for example in FIGS. 5A and 5B, or even an ovate-sphere—an egg-shape which is slightly more spherical than an egg as shown in FIG. 1A. In the ovate spherical version, the shell 22 comprises a first hemisphere 25a, which is a first half-ovoid, and a second hemisphere 25b, which is a second half-ovoid. Each hemisphere 25a,b can have a flattened end 36a,b as shown in FIG. 1A, or a rounded end 37a,b as shown in FIG. 2C.

A pair of longitudinally opposing holes 38a,b are in each of the flattened ends 36a,b or rounded ends 37a,b, of the shell 22. The holes 38a,b are generally opposite one another and along a line of sight. In one version, each opposing hole 38a,b is surrounded by a plate 39a,b with a seal 40a,b therebetween, as shown in FIG. 1E. Referring to FIGS. 6A to 6D, each plate 39a,b comprises a set of holes 47 for fasteners 48. When fastened, the two plates 39a,b press against and squeeze the seal 40 therebetween to provide a watertight seal with the stationary shaft 62. A suitable seal 40 is a face or double face seal made from metal or ceramic for harsh environments. In one version, the seal 40 is, for example, a Jinhua Face Seal, comprising a floating seal from chromium, molybdenum and cast iron and can withstand a maximum pressure 1 to 1.7 BAR/cm$^2$ and a temperature of 20 to 90° C. and is fabricated by Jinhai Machinery Parts of Engineering & Mining Co., Ltd., Hebei, China. Such a floating seal can provide over 4500 hours of life and is fabricated from 15% chrome and 1 to 3% molybdenum to produce a hard material and superior wear and corrosion resistance.

Figure 6A:
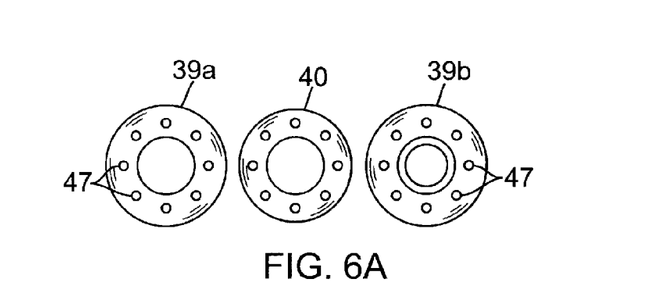
FIG. 6A is a front view of a pair of plates and a seal which are used to seal around the stationary shaft of the shell.
Figure 6B:
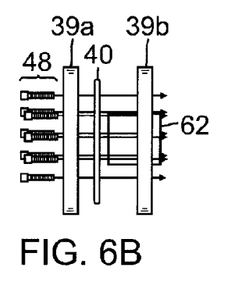
FIG. 6B is an exploded side view showing the joining of the plates and seal around the stationary shaft of the shell.
Figure 6C:
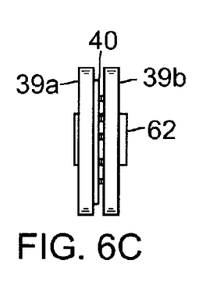
FIG. 6C is a side view of the assembled plates and seal around the stationary shaft of the shell.
Figure 6D:
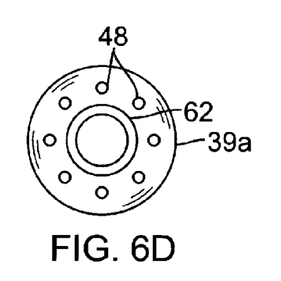
FIG. 6D is a front view of the assembled plates and seal around the stationary shaft of the shell.
Figure 6E:
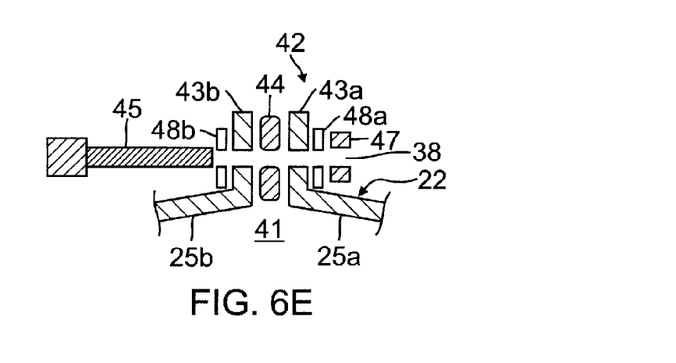
FIG. 6E is a side sectional view of the joint between the first and second hemispheres of the shell of the power generator of FIG. 1A.
Figure 6F:
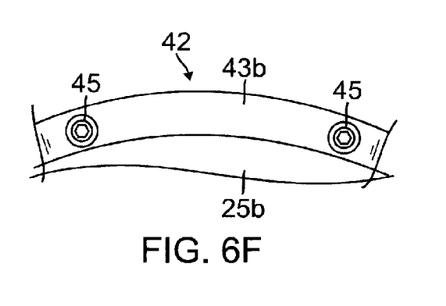
FIG. 6F is a front partial view of the joint between the hemispheres of the shell of FIG. 1A.

The hemispheres 25a,b are joined at the middle 41 of the shell 22 by a sealed joint 42, as shown in FIGS. 6E and 6F. In the version shown, each hemisphere 25a,b, comprises a flange 43a,b which extends radially outward from the body of the shell 22. The flanges 43a,b are generally planar and can also contain a groove for a grommet seal 44 which can be made from a polymer material such as rubber or can be a composite material such as a gasket. A bolt 45 is passed through holes 38 to connect to nuts 47 on the other side, and washers 48a,b can be positioned between the faces of the bolt and nut and the surface of the flanges 43a,b. While one embodiment of the sealed joint 42 is shown, the joint 42 can also be other joints, such as screw thread joints or snap-pull joints or other joining mechanism, which can be easily opened for servicing or replacing the components within the shell 22.

A set of fins 50 is attached to the exterior surface 30 of the shell 22, as shown in FIG. 1A. The fins 50 are capable of rotating the shell 22 about the stationary shaft 62. The angularly spaced apart fins 50 are shaped and arranged along the exterior surface 30 of the shell 22 and rotate by the force applied by the moving body of water 32. The fins 50 can be fully submerged in the water or can dip into the water 32 and at least partially clear the surface of the body of water 32 with each rotation cycle. For fins 50 attached to a buoyant shell 22, in a single rotational cycle, each fin 50 is sequentially pushed by the moving body of water 32 in the first half cycle and rotates freely in air in the second half cycle. When the shell 22 submerges, the entire body of the fins 50 can be covered by the water, or a top portion of selected fins 50 can be outside the water and their base portions in the water 32.

The fins 50 have a profile selected to maximize the thrust provided by the flow direction and velocity of the moving water 32 in a submerged, partially submerged, or in a floating position. In the version shown in FIGS. 1A and 1B, the fins 50 comprise spaced apart rectangular blades attached to the exterior surface 30 of the shell 22. The rectangular blades are shaped and arranged along the exterior surface 30 of the shell 22 to be forced to rotate—and consequently rotate the attached shell 22—with the thrust of the moving body of water 32. Generally, the rectangular blades are used when the shell 22 is floating or partially submerged in a water current of a body of water 32, as shown by the arrow 34 in FIG. 1C. Each rectangular blade is pushed by the water 32 when it is submerged into the water 32 and then clears the surface of the water 32 with each rotation cycle. The rectangular blades extend substantially perpendicularly to the exterior surface 30 of the shell 22 and have a flat surface selected to maximize the thrust provided by the flow direction and velocity of the moving water 32. The rectangular blades can also have a tapered side profile that tapers from a thicker base 54 joined to the exterior surface 30 of the shell 22 to a distal end 56 which is distal from the exterior surface 30 and tapered in shape. The rectangular blades are spaced apart at equal angles along the exterior surface of the shell 22, and in the version shown, the six blades are spaced apart at an angular spacing of about 60 degrees. FIG. 1C shows fins 50 having a side profile that tapers from a thicker base 54 to a thinner distal end 56 to provide better mechanical strength at the base 54.

Figure 2A:
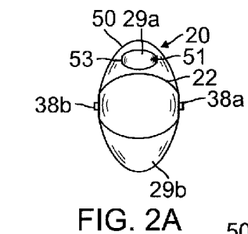
FIG. 2A is a front view of another embodiment of a power generator having cupped fins.
Figure 2B:
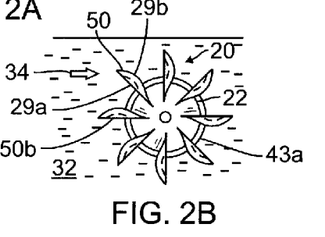
FIG. 2B is a side view of the power generator of FIG. 2A.
Figure 2C:
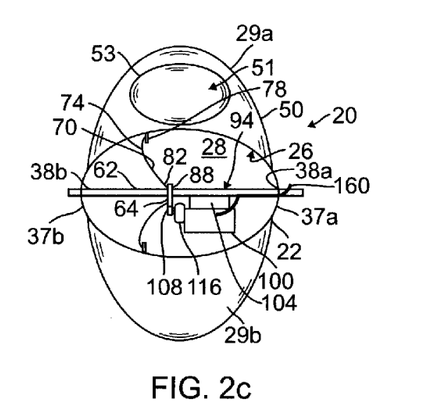
FIG. 2C is a front partial sectional view of an embodiment of the power generator of FIG. 2A showing curved spokes that drive an internally mounted electrical generator.

FIGS. 2A to 2C show another embodiment of a power generator 20 having cupped fins 50 with a flat front surface 29a and a curved rear surface 29b. The cupped fins 50 extend substantially perpendicularly to the exterior surface 30 of the shell 22. The cupped fins 50 have a profile selected to maximize the thrust provided by the flow direction and velocity of the moving water 32. For example, each cupped fin 50 can have comprises a central depression 51 comprising an elongated crescent shaped recess 53; however, the depression 51 can have other shapes, such as oval or circular shapes. The crescent shaped recess 53 cups or spoons the water as it rotates and has a rounded profile that, in operation, would be less likely to harm living creatures, such as environmentally protected species or even fish. In one prospective embodiment, the cupped fin 50 has a tapered side profile to that tapers from a thicker base joined to the exterior surface of the shell 22 to a narrower tapered end that is away from the shell 22. The cupped fins 50 are balanced in weight and also spaced apart at equal angles along the exterior surface of the shell 22.

Figure 3A:
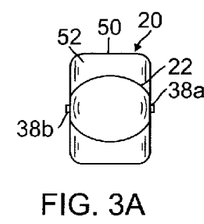
FIG. 3A is a front view of another embodiment of a power generator having rectangular fins.
Figure 3B:
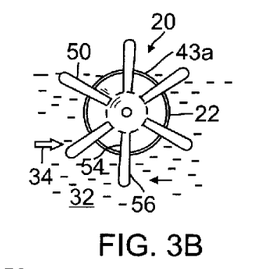
FIG. 3B is a side view of the power generator of FIG. 3A.
Figure 4:
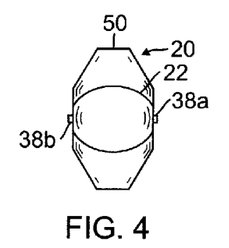
FIG. 4 is a front view of another embodiment of a power generator having polyhedron fins.

FIGS. 3A and 3B shows fins 50 having a side profile that tapers from a thinner base 54 to a distal end 56 which is thicker and rounded. These fins also have rounded corners 52 to reduce drag and minimize breakage in water 32 having debris. Still another version, as shown in FIG. 4, comprises a polyhedron fin 50 that is shaped with edges at different angles to reduce drag in fast waters. In another embodiment, the power generator can have a streamlined, elongated side profile with fins which extend along the length of the shell body. The fins of the elongated shell can have square corners as shown for example in FIG. 5A or can be streamlined to have rounded corners as shown for example in FIG. 5B. While particular versions of fin 50 are described herein, the fin 50 can have other suitable shapes or configurations that could accept the force of the moving body of water 32 to rotate the shell 22 as would be apparent to those of ordinary skill in the art. For example, a submersible or bi-directional power generator 20 may well have different requirements for the shape and configuration of the fin 50.

Referring back to FIGS. 1D and 1E, a stationary shaft 62 extends through the two opposing holes 38a,b of the shell 22. For example, the stationary shaft 62 can extend through the bearings 46a,b. The shaft 62 projects in a generally horizontally direction through the two bearings 46*a,b*. The shaft 62 can be made from a metal, such as stainless steel, or from other materials such as polymers, such as acrylic or a composite material.

A fixed gear 64 is attached, directly or indirectly, to the interior surface 26 of the shell 22. By fixed gear 64 it is meant that the gear is coupled or affixed to the shell 22 in such a manner as to rotate in synchronicity with the rotational movement of the shell 22. In this manner, the fixed gear 64 transfers the rotational movement of the shell 22 caused by the force exerted by the current or tidal flow of the body of water 32 onto the fins 50. For example, the fixed gear 64 can be attached directly to the interior surface 26 of the shell 22, indirectly attached to the interior surface 26 of the shell 22 via spokes or other suspending structures, or mechanically coupled to the interior surface of the shell 22 via a moving mechanical structure such as a gear, pulley and the like. The fixed gear 64 is mounted on a first gear bearing 68, which slides over the shaft 62 to allow the fixed gear 64 can rotate about the shaft.

Figure 1D:
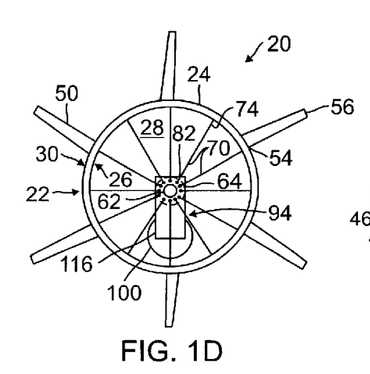
FIG. 1D is a side partial sectional view of the power generator of FIG. 1A, showing spokes connected to a fixed gear which drives an internally mounted electrical generator.
Figure 1E:
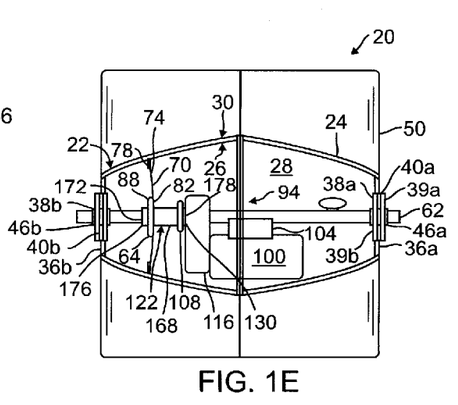
FIG. 1E is a front partial sectional view of the power generator of FIG. 1D.

In the version shown in FIGS. 1D and 1E, the fixed gear 64 is connected directly to the interior surface 26 of the shell 22 via a set of spokes 70. The spokes 70 allow transferring the energy from exterior shell 22 to the fixed gear 64 at the centerline. For example, the spokes 70 can even be used with multiple gears positioned at different centerlines. The spokes 70 can be straight, bent, or curved, and positioned at different positions along the length of the interior volume 28 of the shell 22 to allow more efficient use of the interior volume for the placement of the components therein. The spokes 70 have a first end 74 fitted to a spoke holder 78 that is joined directly to the interior surface 26 of the shell 22, and a second end 82 attached to spoke support 88 on the fixed gear 64. The spokes 70, spoke holder 78, and spoke support 88 can be generally the same as those used for bicycles. Generally, the fixed gear 64 is attached to the interior surface 26 by from about 2 to about 12 spokes.

In this version shown in FIG. 1E, the drive shaft 122 comprises a hollow barrel 168 that encircles and wraps around the stationary shaft set 62. The hollow barrel 168 has a first end 172 connected to a first shaft bearing 176 and a second end 178 connected to a second shaft bearing 180. The fixed gear 64 is mounted on one end of the hollow barrel 168 of the drive shaft 122, and the drive gear 108 is mounted on the other end of the drive shaft to drive the gearbox 116. The latter version also has a drive shaft 122 that is a hollow cylinder encircling the stationary shaft set 62, and the fixed gear 64 and drive gear 108 are mounted at the two ends of the drive shaft to drive the gearbox 116 of the electrical generator assembly 94. It should also be apparent that the spoke arrangements can drive several different electrical generator assemblies 94 within a single shell 22 so long as the generator assemblies are mounted at different positions along the stationary shaft 62.

An alternative spoke configuration connected to different types of fixed gears 64 to drive alternative electrical generator assemblies 94 are shown in FIG. 2C. In this version, the spokes 70 are curved or bent to allow optimal positioning of the internal components by allowing bending of the spokes 70—for example, around the body of a generator, gear box, or other structure. In this version, the fixed gear 64 can be positioned at a greater distance from the front of the shell 22. In this manner, the spokes 70 also allow sizing the shell 22 to different sizes while still using the same internal components. This gives design flexibility when the shell 22 has to be resized and made larger to provide more energy transfer at slower water speeds and to increase the exterior surface area of the shell 22 to accommodate a larger number of fins.

The spokes 70 also allow transferring the energy during different positions along the length of the interior volume, moving the drive shaft away from or towards the stationary shaft. For example, FIG. 7 shows a set of straight spokes 70 having a first end 74 that is mounted at an angle to the plane of the interior surface 26 of between about 15 to about 85 degrees, and a second end 82 that is joined to a relatively smaller fixed gear 64 on the drive shaft 122.

Figures 7, 8A, 8B:
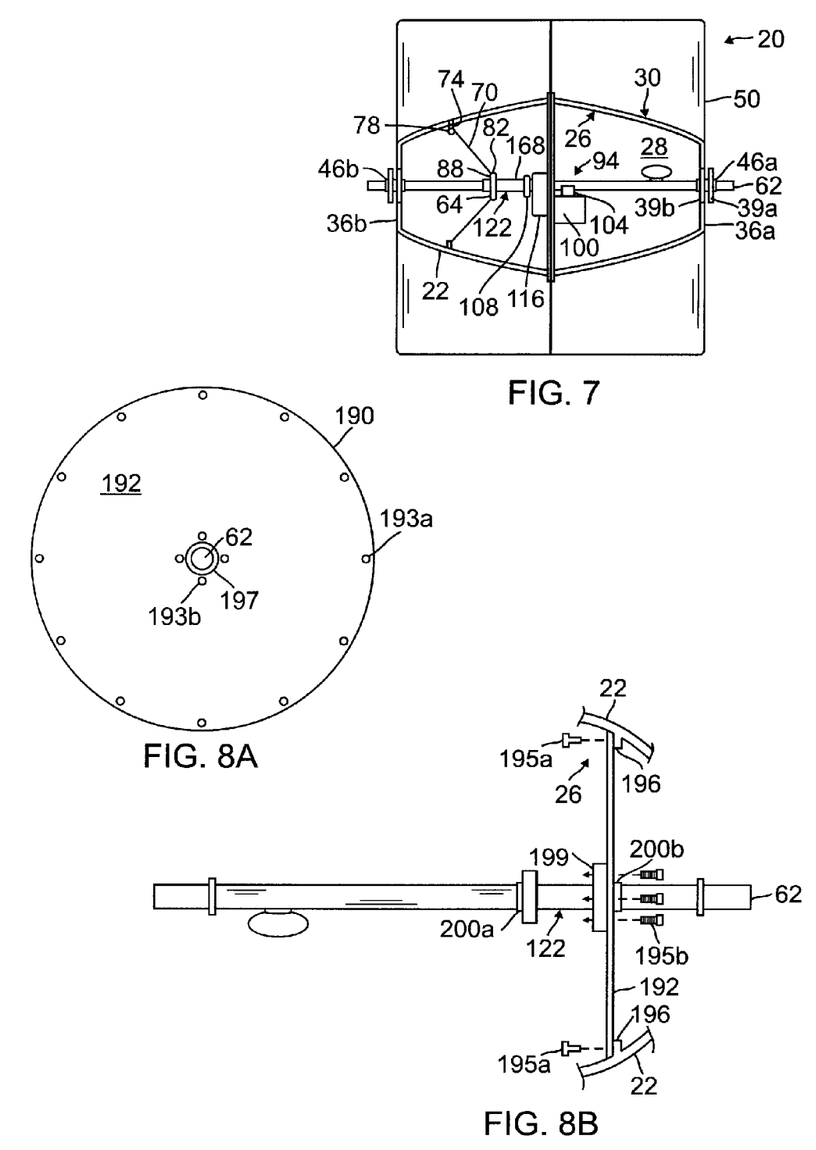
FIG. 7 is a front partial sectional view of another embodiment of a power generator having straight and angled spokes attached to the interior surface of a shell to transfer energy to a drive shaft which drives an internally mounted electrical generator.
FIG. 8A is a front view of the plate which can be attached to the interior surface of a shell of another embodiment of a power generator.
FIG. 8B is partially exploded side view of the plate attached to the drive shaft of the generator of FIG. 8A.

Instead of spokes, a plate 190 can also be attached to the interior surface 26 of the shell 22 and transfer energy to the drive shaft 122, an exemplary version which is shown in FIGS. 8A and 8B. In this version, the plate 190 comprises a disc 192 having a circumference with a first set of holes 193*a* through which first fasteners 195*a* are passed to hold the disc 192 to an inner flange 196 extending out from the interior surface 26 of the shell 22. The disc 192 comprises a central aperture 197 which fits around the stationary shaft 62 and is surrounded by a second set of holes 193*b* to attach the disc 192 to a ring 199 mounted on the drive shaft 122 with second fasteners 195*b*. In this version, the drive shaft 122 comprises a hollow cylinder that is sized to fit around the stationary shaft 62 and which revolves around the shaft 62 with first and second bearings 200*a,b*. Advantageously, the plate 190 provides structural support to the shell 22, which is stronger than the support provided by the spokes 70 but also slightly heavier.

Figure 10A:
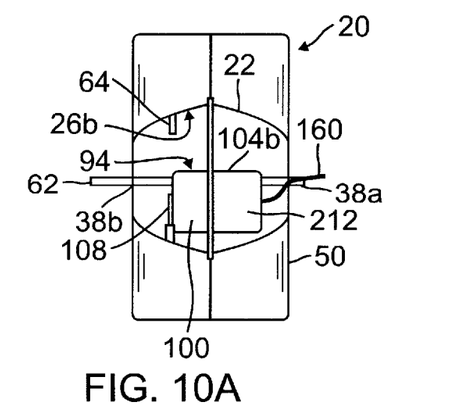
FIGS. 10A and 10B are front and side cross-sectional views, respectively, of a power generator having a spherical shell with an internal electrical generator and gear assembly.
Figure 10B:
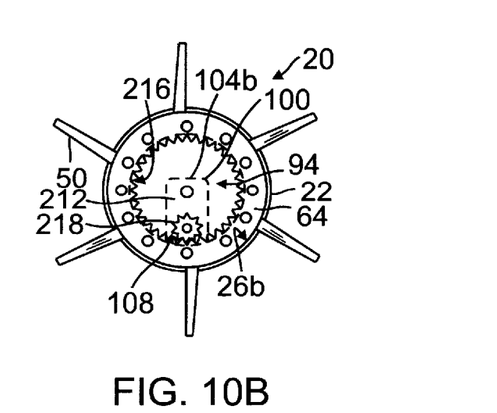

Still another version of a power generator 20 comprising an electrical generator assembly 94 inside a shell 22 is illustrated in FIGS. 10A and 10B. In this version, a shell 22 has a spherical shape, and a stationary shaft 62 extends through aligned holes 38*a,b* through the middle of the shell 22. The electrical generator 100 is mounted on the stationary shaft 62 using a generator mount 104*b* that also serves as a housing 212 for the generator. The fixed gear 64 is circular and attached to the interior surface 26 of the shell 22. The gear 64 has teeth 216 that extend outwardly to engage the teeth 218 of the drive gear 108 which powers the electrical generator 100.

Figure 9A:
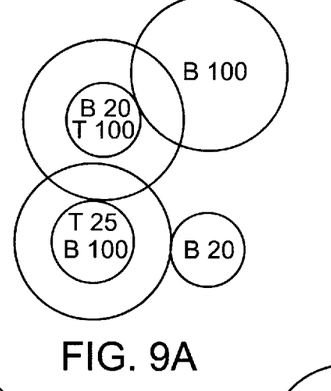
FIGS. 9A to 9C are schematic views of different arrangements of gear assemblies that can be contained in a gearbox.
Figure 9B:
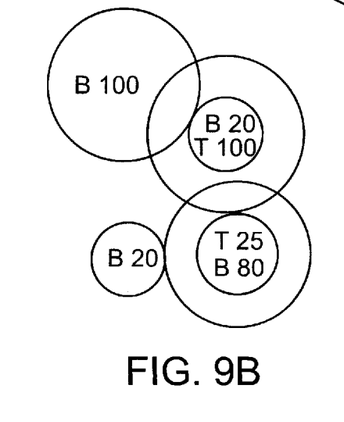
Figure 9C:
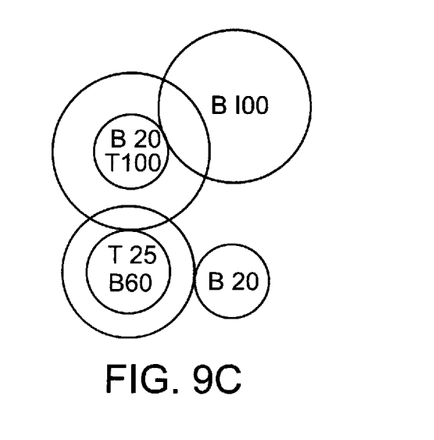

An electrical generator assembly 94 comprises an electrical generator 100 that is suspended from the stationary shaft 62 via a generator mount 104*b*. The fixed gear 64 mechanically couples and engages a drive gear 108 which is mounted on a drive shaft 122. In addition to the drive gear 108, optionally, a gearbox 116 can be used to further increase or decrease the rotational speed of the generator 100. For example, the gearbox 116 can include a set of gears designed to increase the ratio of the rpm of the drive gear 108 relative to the rpm of the generator by a factor of from about five to about 100. The gearbox 116 can be mounted to the generator 100 or to the stationary shaft 62. Several arrangements of gears of the gearbox 116 is shown in FIGS. 9A to 9C. For example, FIG. 9A shows a gear assembly that can increase the rotational speed from an input rotational speed of 10 rpm to an output rotational speed of 1000 rpm using four gears, that are arranged as shown and for the generator 100. FIG. 9B shows a gear assembly that can increase the rotational speed from an input rotational speed of 12 rpm to an output rotational speed of 960 rpm using four gears, that are arranged as shown and sized. FIG. 9C shows a gear assembly that can increase the rotational speed from an input rotational speed of 15 rpm to an output rotational speed of 900 rpm using a plurality of gears.

Figure 11A:
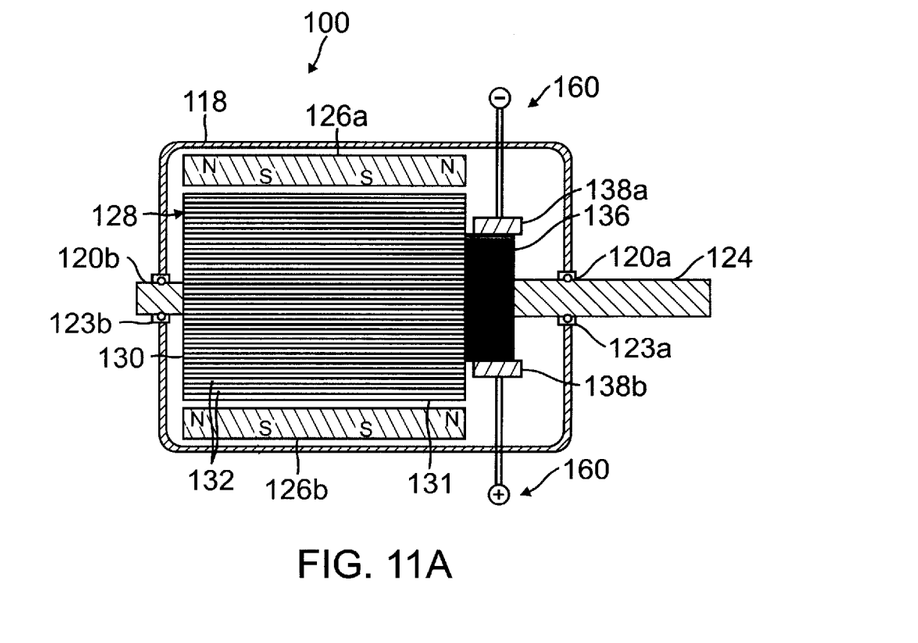
FIG. 11A is a partial sectional side view of an embodiment of an electrical generator.
Figure 11B:
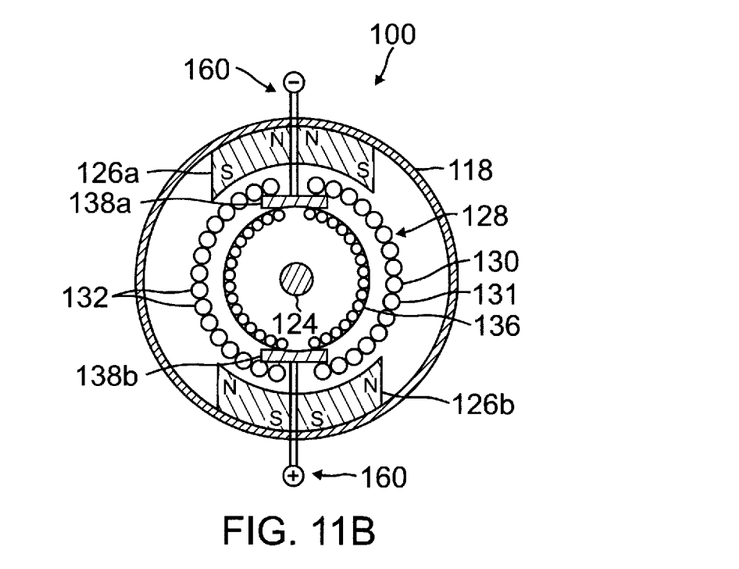
FIG. 11B is a partial sectional front view of the electrical generator of FIG. 11A.

An exemplary embodiment of an electrical generator 100 suitable for use in the electrical generator assembly 94 is shown in FIGS. 11A and 11B. The electrical generator 100 comprises a generator housing 118 comprising a pair of opposing holes 120*a,b* that each have a bearing 123*a,b* through which passes a rotatable generator shaft 124. The rotatable generator shaft 124 can be the same as the drive shaft 122, or a different shaft connected to the drive shaft through the gearbox 116. The generator housing 118 can be made from a metal, such as for example, aluminum. The electrical generator 100 includes a south pole stator magnet 126a and a north pole stator magnet 126b, both of which are attached to the generator housing 100. In the example illustrated in FIG. 11A, the stator magnets 126a,b are shown as plates but they are a partial cylinder, such as a half right cylinder, as shown in FIG. 11B, and they can also have other shapes. An armature 128 comprises a rotor coil 130 comprising a right cylindrical coil 131 of copper wire 132 which is wrapped around the generator shaft 124. An electromotive force is generated in the copper wire 132 of the rotor coil 130 when the generator shaft 124 and overlying armature 128 is rotated between the magnets 126a,b. In operation, the rotating rotor coil 130 passes through the magnetic fields produced by the south and north pole stator magnets 126a,b, respectively, to produce electricity such as a DC voltage. The produced DC voltage passes to a commutator 136 which contacts negative and positive leads 138a,b. The generated electricity is passed to an electrical connector 160 which transmits the electrical power generated by the rotor coil 130 of the electrical generator 100 through the shell 22 to the exterior environment. The external environment can include converters, substations, batteries, and another electrical storage or transmission means. A voltage regulator 155 can also be provided inside the electrical generator 100 or voltage regulation can be handled by an external power control module 158. The amount of field current passed through the voltage regulator 155 to the rotor coil 130 is controlled by the voltage feedback from the voltage regulator 155.

Many alternative embodiments of the electrical generator 100 are possible as would be apparent to those of ordinary skill in the art, and the present invention should not be limited to the illustrative generator described herein. For example, the cylindrical coil 130 of the armature 128 and the magnets 126a,b can have other shapes or be in different configurations. Further, the electrical generator 100 can also be configured to generate an alternating current (AC) voltage, sinusoidal current, pulsed DC current or other types of current. For example, an alternating current generator may be more efficient for operating AC devices as the generated electricity does not have to be converted from DC to AC. Still further, AC voltage generated by a generator such as an alternator can be converted by the output diodes into a pulsating DC voltage, which is transmitted to the rectifier or to an external battery for storage.

In operation, the power generator 20 provides a self-contained floating electricity generator with a watertight shell. The fins 50 of the power generator 20 rotate, driven by a water current of a moving body of water 32, causing rotation of the shell 22, which in turn causes rotation of the fixed gear 64 about the stationary shaft 62. The fixed gear 64 causes rotation of the drive gear 108 on the shaft 122 of the electrical generator 100. The rotational energy of the drive gear 108 can be passed to the gear box 116 to generate additional the torque and/or increases RPM, or directly passed to the generator shaft 124 of the electrical generator 100. The rotating shaft 124 causes rotation of the rotor coil 130 between the south and north pole stator magnets 126a,b respectively to generate an electrical current in rotor coil 130.

Figure 13A:
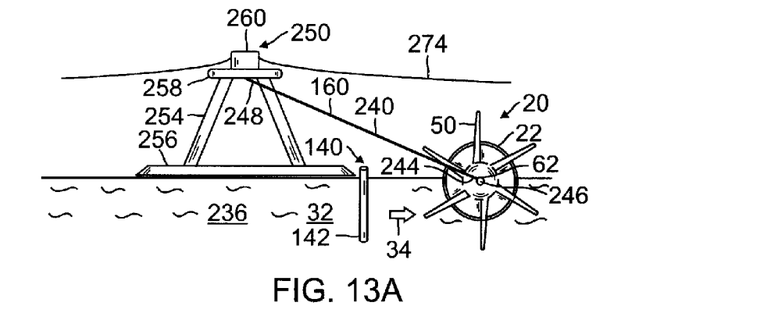
FIGS. 13A and 13B are side and front schematic views, respectively, of an anchoring stand having an anchoring cable to anchor a non-buoyant or partially buoyant power generator at the correct height at the surface of a body of water flowing through a canal.
Figure 13B:
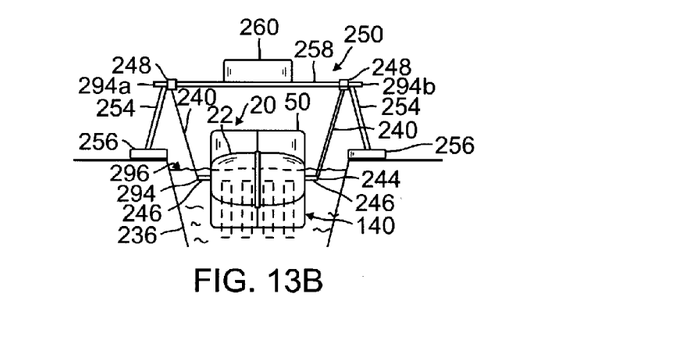
Figure 14:
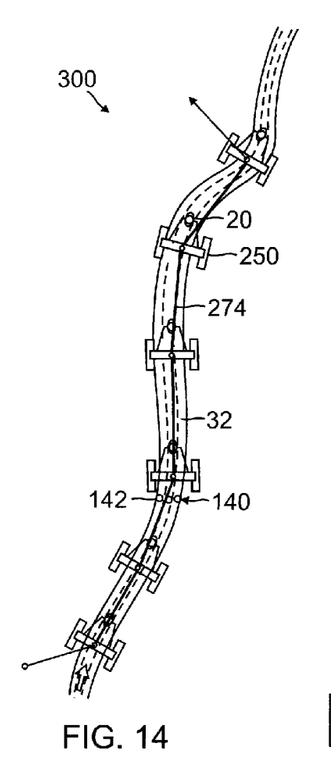
FIG. 14 is a schematic view of an embodiment of a chained assembly of power generators that are each attached to an anchoring stand.

In any of the versions described herein, a debris screen 140, as shown in FIGS. 13A, 13B and 14, can also be placed upstream of the power generator 20 to redirect floating debris all around the power generator 20 allowing the flow of water 32 to move freely across the fins 50 without turbulence or blockage. The debris screen 140 should not significantly reduce the speed or volume of water 32 reaching the fin 50. In one version, the debris screen 140 comprises a set of bars 142 that are spaced apart from one another by small gaps to form channels. The small gaps prevent large debris from entering the channels. The bars 142 can be angled relatively to one another to define apexes upstream of the water flow close to the power generator 20.

Figure 12A:
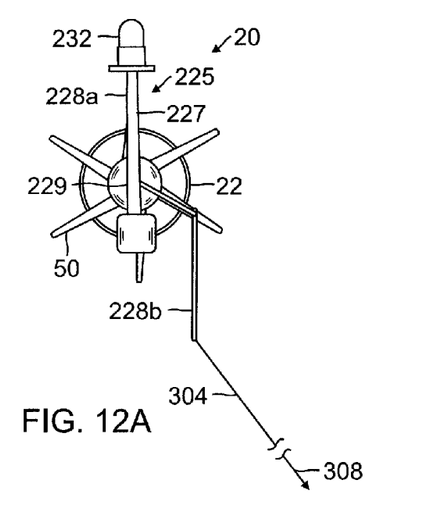
FIGS. 12A and 12B are side and front schematic views, respectively, of a buoy capable of holding a power generator having a non-floating shell.
Figure 12B:
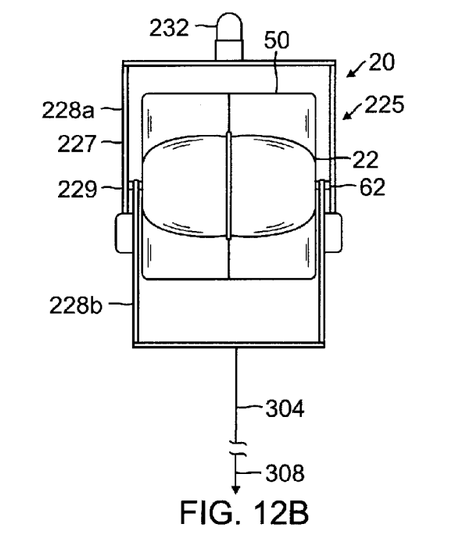

The electrical power generator 20 can comprise a non-buoyant shell 22 and can be tethered to a buoy or suspended from above the body of water 32. In one version, the non-floating power generator 20 is tethered to a floating buoy 225 which is shaped to float on the surface of a body of water 32, an embodiment of which is shown in FIGS. 12A and 12B. The power generator 20 is positioned on the floating buoy 225 so that the fins 50 on the non-buoyant shell 22 dip into the body of water 32. The buoy 225 comprises a frame 227 comprising an upper support 228a and a lower support 228b that are joined at a float 229. The upper and lower supports 228a,b are shown as U-shaped our rectangular in configuration, but could be other shapes, such as half spherical or even half oval. The supports 228a,b can be connected to one another, by a bearing or mobile joint, such that they rotate about the axis defined by the float 229. The stationary shaft 62 of the power generator 20 extends into the upper and lower supports 228a,b so that the shell 22 is held at, or near, the surface of the body of water 32. A warning device 232, such as a flashing light or bell, can be mounted on the upper support 228a. The fins 50 of the power generator 20 can extend out of the frame 227 as shown. In alternative versions, the fins 50 can also be within the frame 227, especially when the frame has larger sidewalls, such as hemispherical sidewalls (not shown) with an opening in the front and back to allow the ingress and egress of water to move the fins 50.

In the embodiment of FIGS. 13A and 13B, the shell 22 is buoyant and floats on the surface of a body of water 32, for example in a canal 236. The shell 22 is tethered by an anchoring cable 240 which has a tethering end 244 connected to one or both of the protruding sections 246 of the stationary shaft 62 that passes through the shell 22. The cable 240 further comprises an anchoring end 248, which is connected to an anchoring stand 250 which is either resting on the bottom of the canal 236 (not shown) or resting on land adjacent to the canal (as shown). The anchoring stand 250 comprises triangular legs 254 extending upwardly from a base 256. The triangular legs 254 support a top plate 258, which in turn can be used to support a transformer 260 and/or an electrical management controller 270 (not shown). The top plate 258 is supported at its two ends 294a,b by the angled legs 254. The angled legs 254 are angled to extend partially over, or to the edge of the canal 236, to reduce the length of the swing stand 280. A suitable angle for the angled legs 254 is from about 45 to 85 degrees from the horizontal. An electrical connector 160 can be passed through or attached to the anchoring cable 240. Chaining electrical cables 274 connect different transformers 260 and/or electrical management controllers 270 to one another or to other power generators 20.

Advantageously, the assembly of the anchoring stand 250 and anchoring cable 240 allow the power generator 20 to move freely in a vertical direction to follow the surface of the body of water 32. A partially buoyant power generator 20 by virtue of its partial buoyancy will settle at a higher height relative to the bottom of the canal 236, when the surface level 296 of the water 32 rises. Conversely, when the water surface level 296 falls, the partially buoyant power generator 20 floats at a lower level in the water, all the while remaining attached to the stand 250.

The anchoring stand 250 can also be built to rest on the bottom of the body of water 32. For example in a shallow stream, it may be more effective to have a anchoring stand 250 with triangular legs 254 that rests on the bottom of the canal or stream to suspend the electrical power generator 20 at the right height above the surface of the water 32 such that the fins 50 dip into the water sufficiently deep to be powered by the motion of the water 32. The triangular legs 254 leave an open area therebetween and rest on the bed of the body of water 32.

The power generator 20 in any of the embodiments described above can be used by itself, or in a chained assembly 300. An exemplary embodiment of a chained assembly 300 is shown in FIG. 14. The chained assembly 300 comprises a set of anchoring stands 250 that each suspend a power generator 20, and which are connected to one another by "chaining" electrical cables 274. A suitable electrical cable 274 comprises, for example, a conductor wire that is suitably sized for the application, fiber-optic cables to transmit instructions to the devices, and a ground cable suitably sized for the application. In one version, the electrical cable 274 comprises a polymer sheath enclosing three conductor wires, 1 to 50 fiber optic cables, such as 50 micron cables, and one ground wire of copper. The electrical cable 274 can connect to other devices using a standard electrical connector, such as a NEMA 114-30 connector, and conventional optical fiber connectors such as a LC connector. The exposed areas of the electrical cable and all the exposed or external connection points are sealed with water-tight polymers or silicone. The electrical connector is connected to electrical switch connects to the power generator 20 and other generation components. The optical fiber connects to an extranet switch to connect to the data/management components. The electrical and management paths are controlled by standard based path technology such as IEEE 802.1w.

Eventually, the electricity generated by all of the power generators 20 of the chained assembly 300 is directed to an electrical substation 302, for direct use in the land adjacent to the power generators, or for transportation to other locations through an electrical grid. Advantageously, such a chained assembly 300 allows a series of power generators 20 can be arranged to follow the path of a body of water 32 such as for example, the canal 236, to allow the power generators 20a-e to generate a much larger power wattage. For example, if each power generator generates 2500 watts, the chained assembly 300 of six power generators can generate 750,000 watts. While the exemplary embodiments, shows a chained assembly comprising six power generators 20, it should be understood that much larger numbers of power generators 20 can be used to generate tens or even hundreds of megawatts of electrical power. Table I shows the water recovery distance calculated for different motor speeds, when different types of electrical generators 100 are used in the power generator 20. For example, when a WindBlue DC-640 generator (available from WINDBLUE POWER Co., New Strawn, Kans., USA) is used in each power generator 20, the distance between our generators and water speed of 1 mph was calculated to be approximately 340 feet, whereas at 15 mph, the distance was calculated to be only 2.66 feet. Thus as the water speed increases, the distance between the power generators 20 can be much shorter. The KAT generators are available from 26/268 sultanganj, Agra, Uttar Pradesh India—282004 and TF generators are available from 26/268 sultanganj, Agra, Uttar Pradesh, India. The chained assembly 300 can also be configured to follow a circuitous path, such as the pot of a naturally occurring stream, river, or even an irrigation or water supply canal. Still further, since each anchoring stand 250 and power generator 20 is a physically separate unit, the anchoring stands 250 can be setup at different heights to follow the gradient of the flowing body of water.

TABLE I

| Generator | Water recovery distance @ water speed | | | |
| --- | --- | --- | --- | --- |
|  | 1 mph | 5 mph | 10 mph | 15 mph |
| WindBlue DC-540 Alternator (prototype) | 340.80 ft | 24.00 ft | 7.38 ft | 2.66 ft |
| KAT 1000 D | 893.43 ft | 61.85 ft | 15.12 ft | 4.40 ft |
| KAT 1250 D | 956.89 ft | 66.04 ft | 15.84 ft | 4.79 ft |
| KAT 1500 D | 1072.19 ft | 73.32 ft | 18.15 ft | 5.17 ft |
| KAT 2000 D | 1220.81 ft | 83.64 ft | 20.29 ft | 5.54 ft |
| KAT 2500 D | 1353.86 ft | 91.85 ft | 22.40 ft | 6.27 ft |
| KAT 3000 D | 1479.51 ft | 100.02 ft | 23.80 ft | 6.63 ft |
| KAT 4000 D | 1730.47 ft | 116.29 ft | 27.94 ft | 7.68 ft |
| KAT 5000 D | 1918.40 ft | 129.14 ft | 30.67 ft | 8.37 ft |
| KAT 6250 D | 2139.67 ft | 144.01 ft | 34.07 ft | 9.39 ft |
| KAT 8250 D | 2453.63 ft | 164.96 ft | 38.80 ft | 10.40 ft |
| TFW2-75 | 2689.53 ft | 180.85 ft | 42.57 ft | 11.65 ft |
| TFW2-90 | 2942.95 ft | 197.74 ft | 46.64 ft | 12.67 ft |
| TFW2-100 | 3099.25 ft | 208.56 ft | 49.04 ft | 12.67 ft |
| TFW2-120 | 3390.66 ft | 227.76 ft | 53.75 ft | 14.48 ft |
| TFW2-150 | 3794.24 ft | 254.74 ft | 59.79 ft | 16.17 ft |
| TFW2-200 | 4372.35 ft | 279.94 ft | 68.94 ft | 18.50 ft |
| TFW2-250 | 4890.52 ft | 328.03 ft | 76.97 ft | 20.65 ft |
| TFW2-280 | 5173.14 ft | 346.93 ft | 81.44 ft | 21.98 ft |
| TFW2-300 | 5358.15 | 358.99 ft | 84.11 ft | 22.84 ft |
| TFW2-320 | 5531.07 ft | 370.85 ft | 86.78 ft | 23.52 ft |
| TFW2-350 | 5783.69 ft | 387.73 ft | 90.79 ft | 24.52 ft |

It should be understood that while the exemplary embodiment of the chained assembly shown in FIG. 14 uses the anchoring stands 250 to suspend the power generators 20, a chained assembly of buoyant or partially buoyant power generators 20 can also be arranged to follow the path of the canal 236 with or without the need for the anchoring stands 250. For example, if the canal 236 is known to have a shallow water depth or to dry out at some times of the year, anchoring stands 250 can be used to prevent the power generators 20 from touching the bottom of the canal. The type of anchoring stand 250 used can also vary. For example, another type of anchoring stand 250 could be two or more pillars, made of steel or reinforced concrete, which are implanted in the raised ground on either side of the moving body of water 32, or from the bottom of the water 32. Other types of anchoring assemblies can be used for each individual power generator 20 or for a chained assembly 300 comprising a plurality of power generators. The shell 22 of each power generator 20 can be tethered with a mooring line 304 to a fixed point, for example to an adjacent or proximate location on nearby land or to a conventional anchor 308 at the bottom of a body of water. Such tethering means can prevent the power generator 20 from floating away in the water current. Similarly the floating buoy 225 with power generator 20 can be tethered with a mooring line 304 to an anchor 308. The mooring line 304 can be a nylon or other material that is flexible and strong, and which is attached to the exterior surface of the shell 22 of a power generator 20, or which in the case of the floating buoy 225 can be attached to the frame 227 of the buoy 225. The anchor 308 can be a weight, such as a body of metal, sand, or other material, connected by the mooring line 304 to the shell 22 or frame 227. The anchor 308 can also be a dead weight, spike or concrete pile, which is affixed to adjacent land, or on the ground at the bottom of the water 32. In still other systems, the anchor 308 can comprise one or more pillars or pillions which extend from the bottom of the body of water 32 and connect to the floating power generator 20 with the mooring line 304. Alternative systems can be used to mount the power generator 20 in canals and small water 32 ways. In one such system, the power generator 20 is anchored to the bottom of the body of water 32 by a mooring line 304 comprising a flexible chain that maintains its operational height and minimal operation depth independent of flow changes of the surrounding body of water 32.

Figure 15:
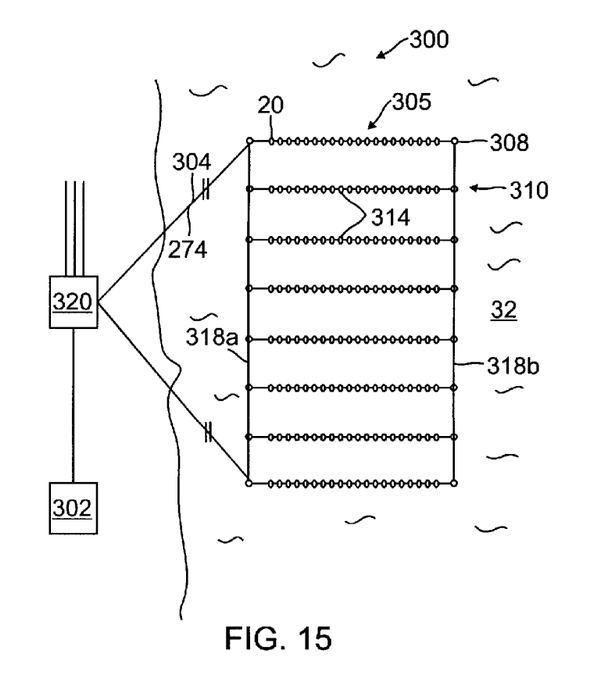
FIG. 15 is a schematic view of another exemplary embodiment of a chained assembly of power generators suitable for large bodies of water.

Another exemplary embodiment of a chained assembly, as shown in FIG. 15, is suitable for larger bodies of water 32, like river deltas and oceans. The grid 305 of connected power generators 20 provides a large deployment basis that offers redundant electrical generation and transmission paths. Thus, if one power generator 20 malfunctions or breaks, the level of generated electric power will not appreciably decrease. These large-scale deployments can also be connected to electrical grids, battery banks, or even an electrical substation 302. For smaller deployment, current conversion and voltage manipulation can occur at the anchor or frame. For large deployments, a substation may be used to clean power to connect to the grid 305.

In the version shown, the chained assembly 300 comprises a grid 305 that is a flexible grid 310 of mooring lines 304 that suspends a set of power generators 20 above the water 32. The grid 310 comprises a plurality of suspension lines 314 which are used to hold a set of spaced apart power generators 20, the suspension lines 314 are spaced apart and attached to pairs of holding lines 318a,b. In this version, one of the holding lines 318a is attached with a mooring line 304 to land, and anchors 308 are attached to the other holding line 318b to stabilize the chained assembly 300 in the water 32. The power generators 20 are connected by chaining electrical cables 274, which in turn, are connected to the substation 320. The chained assembly 300, by virtue of the flexible grid 310 of suspension lines 314 and holding lines 318a,b can follow the changing surface topography of the waves of an ocean without breaking or becoming irreversibly twisted or distorted. In this version, the power generators 20 can have buoyant shells 22 which support the suspension lines 314 and holding lines 318a,b or the suspension and holding lines 314, 318a,b, respectively, can themselves can be flotation devices, and/or the corners or joints of the flexible grid 310 can comprise floating buoys (not shown) which support the weight of the flexible grid 310 and the power generators 20.

Figure 16:
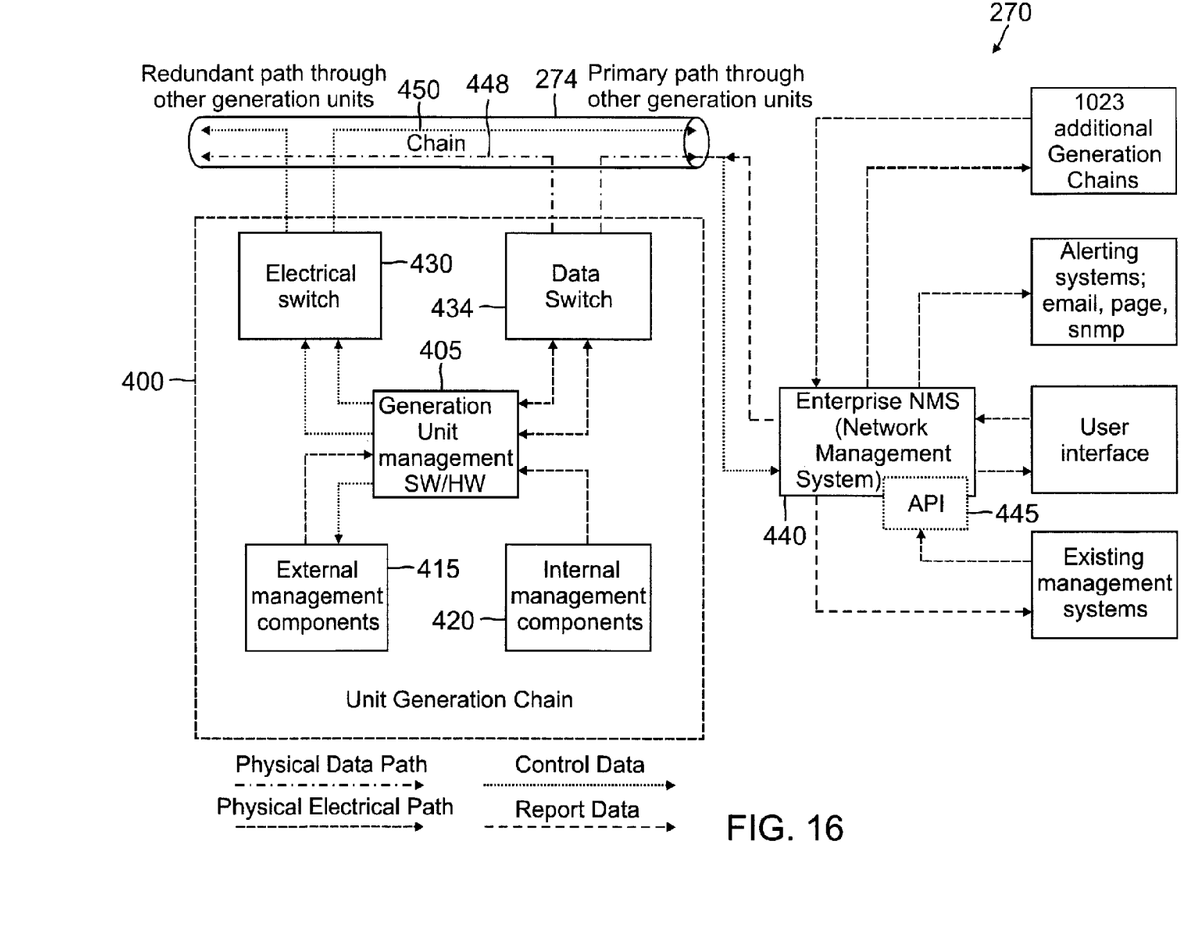
FIG. 16 is a block diagram of an exemplary embodiment of an electrical management controller.

A block diagram of an exemplary embodiment of an electrical management controller 270 is shown in FIG. 16. Each power generator 20 comprises a generator controller 400. The generator controller 400 comprises an integrated circuit chip that is programmable or non-programmable and has associated memory, such as random access memory and read only memory. A suitable chip can be a Pentium (TM) chip fabricated by Intel Corporation, Santa Clara Calif. Conventional data entry systems such as keyboards, mice and display are used to enter software program code and data into the generator controller 400. In the exemplary embodiment shown, the generator controller 400 comprises program code, which can be stored as source code or compiled code in the memory. The program code can be written in assembly language, C programming language, Pascal, Java, or other languages. While an exemplary embodiment of a generator controller 400 is described herein, it should be understood that other embodiments are possible. Thus the scope of the present claims should not be limited to the embodiments described herein.

In the version shown, the generator controller 400 comprises management program code 405 which monitors the power generator 20 and provide alerts, exceptions, reports on historical data, and also allows a graphical user interface. The management program code 405 provides real-time monitoring, historical reporting and alarm notification. In one version, the management program code 405 comprises a generation unit management code 410, which controls external management component code 415 and internal management component code 420. The external management component code 415 sends and receives signals from other power generators or from an external controller for the entire chained assembly of power generators. For example, the external management component code 415 can receive and send signals from other power generators that would indicate power generated, functioning or malfunctioning of units, and external connection status. The code 415 can further comprise instructions to receive and send signals to an external controller concerning its own power generator 20.

The internal management component code 420 sends and receives signals from its own power generator 20, to other power generators or an external controller for the entire chained assembly of power generators. For example, the internal management component code 420 can have coded instructions for receiving and sending signals to other power generators concerning operation and output of the generator itself. The code 420 can further comprise instructions to receive and send signals to an external controller concerning its own power generator 20.

The generator controller 400 can also include an electrical switch 430 that controls the flow or electricity out of the power generator 20 to connect the same to other power generators 20 through the chaining electrical cables 274, or to transport the generated electricity directly to an external controller or transformer for the entire chained assembly 300. The electrical switch 430 can also have a fuse that disconnects the power generator 20 from the remaining chain should the power generator fail during use. Still further, the generator controller 400 can also include a data switch 434 which controls the flow of information into and out of the power generator 20. For example, the data switch 434 can be a router or network type switch. The data switch 434 can also send and receive data to an enterprise network management system 440 which includes an API 445 switch. The enterprise network management system 440 performs the functions of alerting systems by sending e-mails, pages or SNMP. In addition, the enterprise network management system 440 can also connect to a user interface for receiving data and programming instructions, or even program code, from a user. Still further, the enterprise network management system 440 can comprise program code that communicates with existing management systems.

As shown in FIG. 12, the chaining electrical cables 274 which connect the power generators 20 to one another or to an external transformer or controller, can have multiple cables for transporting electricity, and separately transporting data. For example, the chaining electrical cables 274 can include a data cable and an electricity cable. Still further, the chaining electrical cables 274 can include first cables 448 that establish a primary electrical path through other power generators 20, and second cables 450 that establish redundant electrical passed through the other generators 20. The cables can also be used to bus management information from the individual power generators 20 to the end points such as a transformer or usage point.

The hydroelectric power generator 20 according to embodiments of the present invention presents numerous advantages over conventional systems. For example, the power generator 20 allows extraction of energy from streams, canals and rivers, and in places where soil and geographic conditions make the use of dams difficult. The power generator 20 also allows extraction of energy of river currents in large rivers and deltas without foreclosing the use of the river for navigation. It even can be used in large grids in the ocean. The generators 20 further enable relocation and shifting of energy extraction means to those parts of a river where the currents are optimal. Still further, the power generator 20 can be used as a single unit or to construct larger power plants of high efficiency and moderate cost. These systems can enable the production of electrical power in large quantities, with precise control of frequency and synchronization such that the power can be merged with conventional electrical power generation systems, despite fluctuations in water flow.

Although exemplary embodiments of the present invention are shown and described, those of ordinary skill in the art may devise other embodiments which incorporate the present invention, and which are also within the scope of the present invention. Furthermore, the terms below, above, bottom, top, up, down, first and second and other relative or positional terms are shown with respect to the exemplary embodiments in the figures are interchangeable. Therefore, the appended claims should not be limited to the descriptions of the preferred versions, materials, or spatial arrangements described herein to illustrate the invention.

What is claimed is:

1. A hydroelectric power generator assembly for generating electrical power from a moving body of water, the power generator assembly comprising:
   a buoyant power generator comprising:
   (i) a shell comprising a wall having interior and exterior surfaces, and which encloses an interior volume, wherein the shell has the shape of a sphere, an oval, an elongated spheroid, an oblong spheroid, or an ovate sphere;
   (ii) a fixed gear that is fixedly attached to the interior surface of the shell;
   (iii) a stationary shaft that extends across the interior volume of the shell, the stationary shaft comprising protruding sections that pass through the shell;
   (iv) a set of fins attached to the exterior surface of the shell, the fins capable of rotating the shell about the stationary shaft from a force of the moving body of water; and
   (v) an electrical generator mounted on the stationary shaft, the electrical generator comprising a drive gear that engages the fixed gear to drive the electrical generator, and an electrical connector to transmit the generated electrical power to an external environment.

2. A generator assembly according to claim 1 wherein the shell is (i) sufficiently buoyant to float on a surface of a body of water, or (ii) sufficiently buoyant to float at a height inside a body of water.

3. A generator assembly according to claim 2 wherein the shell comprises a wall composed of polymer, fiberglass, or metal.

4. A generator assembly according to claim 1 wherein the shell comprises an ovate-sphere or sphere.

5. A generator assembly to claim 4 wherein the ovate-sphere or sphere comprises a first hemisphere and a second hemisphere.

6. A generator assembly according to claim 1 wherein the fins (i) have a profile selected to maximize a thrust provided by a flow direction and velocity of the moving body of water, and (ii) are spaced apart at equal angles along the exterior surface of the shell.

7. A generator assembly according to claim 1 wherein the fins comprise from about 2 to about 24 blades, and each blade is spaced apart from an adjacent blade by an angular spacing of from 30 to about 120 degrees.

8. A generator assembly according to claim 1 wherein the fins comprise rectangular blades that extend outward, and substantially perpendicularly, from the exterior surface of the shell.

9. A generator assembly according to claim 8 wherein the rectangular blades comprise a tapered side profile that tapers from a thicker base that is joined to the exterior surface of the shell to a tapered end which is distal from the exterior surface.

10. A generator assembly according to claim 1 wherein the shell comprises a pair of longitudinally opposing holes, and wherein the stationary shaft extends through the opposing holes.

11. A generator assembly according to claim 10 wherein the pair of holes in the shell each comprise a bearing.

12. A generator assembly according to claim 1 wherein the fixed gear is attached to the interior surface of the shell via spokes or other suspending structures.

13. A generator assembly according to claim 1 wherein the electrical generator assembly is suspended from the stationary shaft via a generator mount.

14. A generator assembly according to claim 1 comprising a gearbox between the drive gear and a drive shaft that powers the generator, the gearbox comprising a set of gears that increase a ratio of the rpm of the drive gear relative to the rpm of the generator by a factor of from about 5 to about 100.

15. A generator assembly according to claim 1 comprising a hollow barrel which wraps around the stationary shaft with a first end connected to a first shaft bearing and a second end connected to a second shaft bearing.

16. A generator assembly according to claim 1 comprising a pair of anchoring stands positioned on either side of the moving body of water.

17. A generator assembly according to claim 16 wherein the anchoring stands each comprise triangular legs extending upwardly from a base.

18. A generator assembly according to claim 16 comprising an anchoring cable having tethering ends connected to the protruding sections of the stationary shaft and anchoring ends connected to the anchoring stands.

19. A generator assembly according to claim 1 further comprising an anchoring stand assembly to suspend the buoyant power generator in the moving body of water to allow the power generator to move freely in a vertical direction to follow the surface of the moving body of water while still preventing the power generator from touching the bottom of the moving body of water.

20. A hydroelectric power generator assembly for generating electrical power from a moving body of water, the power generator assembly comprising:
   (a) a buoyant power generator comprising:
   (i) a shell comprising a shape of a sphere, an oval, an elongated spheroid, an oblong spheroid, or an ovate sphere, the shell having a wall composed of polymer or fiberglass, the wall having an interior surface, an exterior surface, and enclosing an interior volume;
   (ii) a fixed gear that is fixedly attached to the interior surface;
   (iii) a stationary shaft that extends across the interior volume, the stationary shaft comprising a protruding section that passes through the shell;
   (iv) a set of fins attached to the exterior surface, the fins capable of rotating the shell about the stationary shaft from a force of the moving body of water; and
   (v) an electrical generator mounted on the stationary shaft, the electrical generator comprising a drive gear that engages the fixed gear to drive the electrical generator, and an electrical connector to transmit the generated electrical power to an external environment; and (b) an anchoring stand and an anchoring cable capable of allowing the power generator to move freely in a vertical direction to follow the surface of the moving body of water, the anchoring cable having a tethering end connected to one or both of the protruding sections of the stationary shaft, and an anchoring end connected to the anchoring stand.

21. A generator assembly according to claim 20 wherein the buoyant power generator shell is (i) sufficiently buoyant to float on a surface of the moving body of water, or (ii) sufficiently buoyant to float at a height inside the moving body of water.

22. A generator assembly according to claim 20 wherein the fins comprise rectangular blades which extend outward, and substantially perpendicularly, from the exterior surface of the buoyant shell.

* * * * *